(12) United States Patent
Liu et al.

(10) Patent No.: US 8,331,014 B2
(45) Date of Patent: Dec. 11, 2012

(54) PIGMENT-BASED INKS

(75) Inventors: Qin Liu, Corvallis, OR (US); Zhang-Lin Zhou, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 136 days.

(21) Appl. No.: 12/917,672

(22) Filed: Nov. 2, 2010

(65) Prior Publication Data

US 2012/0105938 A1 May 3, 2012

(51) Int. Cl.
*G02B 26/00* (2006.01)
*G09G 3/34* (2006.01)
(52) U.S. Cl. .......................... 359/296; 345/107
(58) Field of Classification Search .................. 359/296; 345/107; 204/600
See application file for complete search history.

(56) References Cited

U.S. PATENT DOCUMENTS

| 7,605,899 | B2 | 10/2009 | Shikina et al. | |
|---|---|---|---|---|
| 2004/0257330 | A1 * | 12/2004 | Minami | 345/107 |
| 2004/0265756 | A1 | 12/2004 | Horie | |
| 2007/0160776 | A1 | 7/2007 | Kwon et al. | |
| 2007/0186804 | A1 | 8/2007 | Heckmann et al. | |
| 2008/0177003 | A1 | 7/2008 | Lee et al. | |
| 2010/0156780 | A1 | 6/2010 | Jacobson et al. | |

FOREIGN PATENT DOCUMENTS

WO WO-0052102 9/2000

* cited by examiner

*Primary Examiner* — William Choi
(74) *Attorney, Agent, or Firm* — David W. Collins

(57) ABSTRACT

A pigment-based ink includes a non-polar carrier fluid and pigment particles suspended in the non-polar carrier fluid. The pigment particles have surface functionalized anionic groups. A combination of an electronic display and an electronic ink is provided, as is a method for modifying the pigment particles.

19 Claims, 4 Drawing Sheets

PIGMENT-BASED INKS

BACKGROUND

The present disclosure relates generally to pigment-based inks.

Electronic inks are commonly used in electronic displays. Such electronic inks often include charged colorant particles that, in response to an applied electric field, rearrange within a viewing area of the display to produce desired images. This effect is known as electrophoresis, or more broadly electrokinetics.

Electronic inks are useful as a medium to low power reflective types of displays. Conventional electrophoretic displays feature either black and white states (by exchanging white and black charged colorant particles at the top of the display cell) or white and colored states (by moving white colorant particles in a dyed fluid up and down electrophoretically). These conventional electrophoretic displays cannot provide a clear state and cannot be easily extended to provide full-color displays with bright colors. There remain, however, technical challenges in identifying ink components that can stably operate in the electrophoretic/electrokinetic regime.

Many current approaches to achieve full color in low power reflective display rely on combining color filter and a black/white switching electronic ink. However, this reduces lightness and chroma for the end devices.

To achieve full color with bright images, the use of stacked device architecture based on the principle of printing with subtractive CMYK pigments has been developed. This new architecture requires a completely new design of novel electronic inks, which need to be switched between clear and color states. Many of the colored inks so far have not shown good compaction and/or spreading of the pigments upon application of an electric field.

DESCRIPTION

Figure 1A:
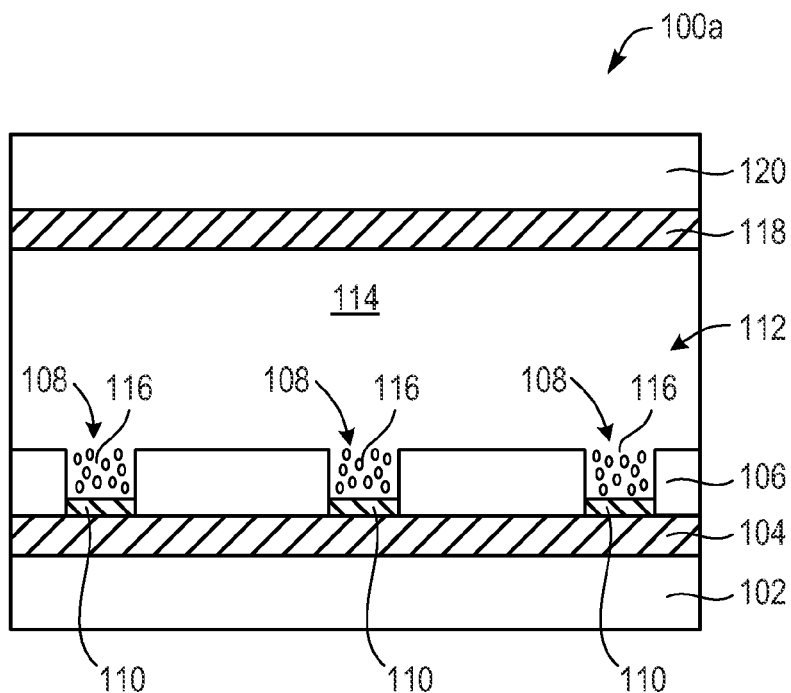
FIG. 1A illustrates a cross-sectional view of one example of an electro-optical display in a clear optical state.

Reference is made now in detail to specific examples for practicing the invention. Alternative examples are also briefly described as applicable.

Aspects of the present invention were developed in relation to electronic inks, but the specification and claims are not so limited.

In the following detailed description, reference is made to the accompanying drawings which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

As used herein, the term "grayscale" applies to both black and white images and monochromatic color images. Grayscale refers to an image including different shades of a single color produced by controlling the density of the single color within a given area of a display.

As used herein, the term "over" is not limited to any particular orientation and can include above, below, next to, adjacent to, and/or on. In addition, the term "over" can encompass intervening components between a first component and a second component where the first component is "over" the second component.

As used herein, the term "adjacent" is not limited to any particular orientation and can include above, below, next to, and/or on. In addition, the term "adjacent" can encompass intervening components between a first component and a second component where the first component is "adjacent" to the second component.

As used herein, the term "electronic ink display" is a display that forms visible images using one or more of electrophoresis, electro-convection, electro-osmosis, electrochemical interactions, and/or other electrokinetic phenomena.

The article 'a' and 'an' as used in the claims herein means one or more.

Bi-state and/or tri-state electrophoretic display cells (or elements) having a three-dimensional architecture for compacting charged colorant particles within the display cells are described below. A bi-state display cell having a dark state and a clear state is provided by an electronic ink with charged colorant particles in an optically transparent fluid. A clear state is achieved when the colorant particles are compacted and a colored state is achieved when the colorant particles are spread. An electronic ink with charged white particles in a colored fluid enables white and spot-color states, with the color of the colored state depending on the color of the fluid. The ink fluid is colored by a dye, nanoparticle colorants, pigments, or other suitable colorants. A white state is achieved when the white particles are spread and a colored state is achieved when the white particles are compacted. By combining the white particles in the colored fluid with a colored resin on the back of the display cell, a tri-state display cell is provided.

A purely electrophoretic display cell may include a three-dimensional architecture to provide a clear optical state. In this architecture, the geometrical shape of the display cell has narrowing portions in which electrophoretically translated colorant particles compact in response to appropriate bias conditions applied to driving electrodes on opposite sides of the display cell. The three-dimensional structure of the display cell introduces additional control of electrophoretically moving colorant particles. As a result, desired functionalities can be achieved with a relatively well developed and more stable electrophoretic ink. The driving electrodes are passivated with a dielectric layer, thus eliminating the possibility of electrochemical interactions through the driving electrodes from direct contact with the electrophoretic ink. In other examples, the driving electrodes are not passivated, thus allowing electrochemical interactions with the electrophoretic ink.

FIG. 1A illustrates a cross-sectional view of one example of an electro-optical display 100a in a clear optical state. Electro-optical display 100a includes a first substrate 102, a first electrode 104, a dielectric layer 106 including reservoir or recess regions 108, thin layers 110, a display cell 112, a second electrode 118, and a second substrate 120. Display cell 112 is filled with a carrier fluid 114 with colorant particles 116. In some examples, thin layers 110 may be opaque. In other examples, thin layers 110 may be transparent.

First substrate 102 is parallel to and opposite second substrate 120. In one example, first substrate 102 and/or second substrate 120 include a reflective material or an optically clear or transparent material, such as plastic (e.g., polyethylene terephthalate (PET)), glass, or other suitable material. In another example, substrate 102 is coated with or comprises a reflective material. In yet another example, substrate 102 is an opaque material. In still another example, a light scatterer is formed on substrate 102.

First electrode 104 is a continuous, blanket, or solid plate electrode formed on first substrate 102. In other examples, first electrode 104 is a segmented or pixilated electrode. In one example, first electrode 104 is transparent. Second electrode 118 is a continuous, blanket, or solid plate electrode formed on second substrate 120. In other examples, second electrode 118 is a segmented or pixilated electrode. Second electrode 118 may be transparent or opaque. In one example, first electrode 104 and/or second electrode 118 are formed from a film of transparent conductive material. The transparent conductive material can include carbon nanotube layers, silver or nickel nanowires, a transparent conducting oxide such as ITO (indium tin oxide), or a transparent conducting polymer such as PEDOT (poly 3,4-ethylenedioxythiophene). Other examples use other materials that provide suitable conductivity and transparency for electro-optical display 100a.

Dielectric layer 106 is formed on first electrode 104 and includes a transparent dielectric material. Dielectric layer 106 is structured with recess regions 108 that allow charged colorant particles 116 to collect and compact on conducting layers 110 in response to a suitable bias being applied to first electrode 104 with respect to second electrode 118.

Thin layers 110 are self-aligned and formed within each recess region 108 on first electrode 104. The thickness of thin layers 110 is less than the thickness of dielectric layer 106. In one example, thin layers 110 are metal layers, such as Ni, Cu, Au, Pd, or other suitable metal layers that are electroplated onto first electrode 104 within recess regions 108. In another example, the portions of first electrode 104 within recess regions 108 are anodized, which provides thin layers 110 and passivation for first electrode 104. In another example, thin layers 110 are plated dielectric layers that prevent direct electrical contact between first electrode 104 and carrier fluid 114 with colorant particles 116.

Carrier fluid 114 within display cell 112 includes either polar fluids (e.g., water) or nonpolar fluids (e.g., dodecane). In other examples, anisotropic fluids such as liquid crystal may be used. The fluid may include surfactants such as salts, charging agents, stabilizers, and dispersants. In one example, the surfactants provide a fluid that is an electrolyte that is able to sustain current by ionic mass transport.

Colorant particles 116 in carrier fluid 114 are comprised of a charged material in the case of an electrokinetic display. The colorant particle material should be able to hold a stable charge indefinitely so that repeated operation of the display does not affect the charge on the colorant particles. Colorant particle materials having a finite ability to hold a stable charge, however, can be used in accordance with the various examples while they maintain their charge. Colorant particles may have a size between several nanometers and several microns and have the property of changing the spectral composition of the incident light by absorbing and/or scattering certain portions of the spectrum. As a result, the particles appear colored, which provides a desired optical effect. In other examples, the colorant can be a dye, which is comprised of single absorbing molecules.

As disclosed herein, the carrier fluid in the display cell 112 may be a non-polar solvent and the colorant particles 116 may be pigments with the surfaces of the particles functionalized as described below.

Electro-optical display 100a is in a clear optical state. The clear optical state is provided by applying a negative bias to first electrode 104 relative to a reference bias applied to second electrode 118. The negative bias applied to first electrode 104 provides an electrophoretic pull that attracts positively charged colorant particles 116. As a result, colorant particles 116 are compacted on the surface of thin layers 110 within recess regions 108. With colorant particles 116 in clear fluid compacted on the surface of thin layers 110 in recess regions 108, the clear optical state is achieved. In addition, due to thin layers 110, colorant particles 116 do not tint electro-optical display 110a in the clear optical state.

The positively charged colorant particles 116 can be electrophoretically and convectively moved to first electrode 104 and held there by the negative bias applied to first electrode 104 relative to second electrode 118. In one example, the convective flow is a transient effect caused by the ionic mass transport in carrier fluid 114, without charge transfer between carrier fluid 114 and first electrode 104. In this case, the convective flow proceeds for a finite amount of time and facilitates the compaction of colorant particles 116 on thin layers 110 in recess regions 108. After compaction, colorant particles 116 are held on thin layers 110 within recess regions 108 by electrostatic forces generated by a coupling with first electrode 104.

In another example, the convective flow is induced by ionic mass transport in carrier fluid 114 and by charge transfer between the carrier fluid and first electrode 104 and second electrode 118. The charge transfer can occur when carrier fluid 114 is electrically coupled to the electrodes through direct contact with the electrodes or separated from the electrodes by an intermediate layer including one or more materials or by thin layers 110. In the latter case, charge transfer is facilitated by the internal electrical conductivity of the intermediate layer, either volumetric or via pinholes and other defects.

Figure 1B:
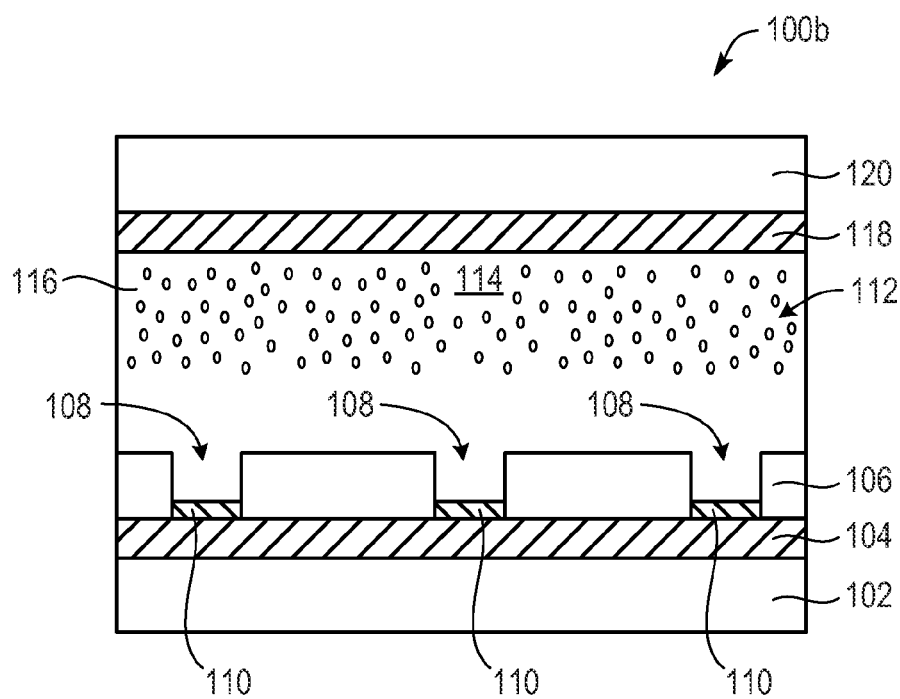
FIG. 1B illustrates a cross-sectional view of one example of an electro-optical display in a spread optical state.

FIG. 1B illustrates a cross-sectional view of one example of an electro-optical display 100b in a spread optical state. The spread optical state is provided by applying pulses or no bias to the first electrode 104 relative to the reference bias applied to the second electrode 118. The pulses or no bias applied to the first electrode 104 spread the colorant particles 116 throughout display cell 112. With the colorant particles 116 in a clear fluid spread throughout the display cell 112, the spread optical state having the color of the colorant particles 116 is achieved.

The structure depicted in FIGS. 1A-1B is but one example of many possible configurations of an electronic ink display. The electronic inks disclosed herein are intended for use in all such electronic ink displays.

Figure 2:
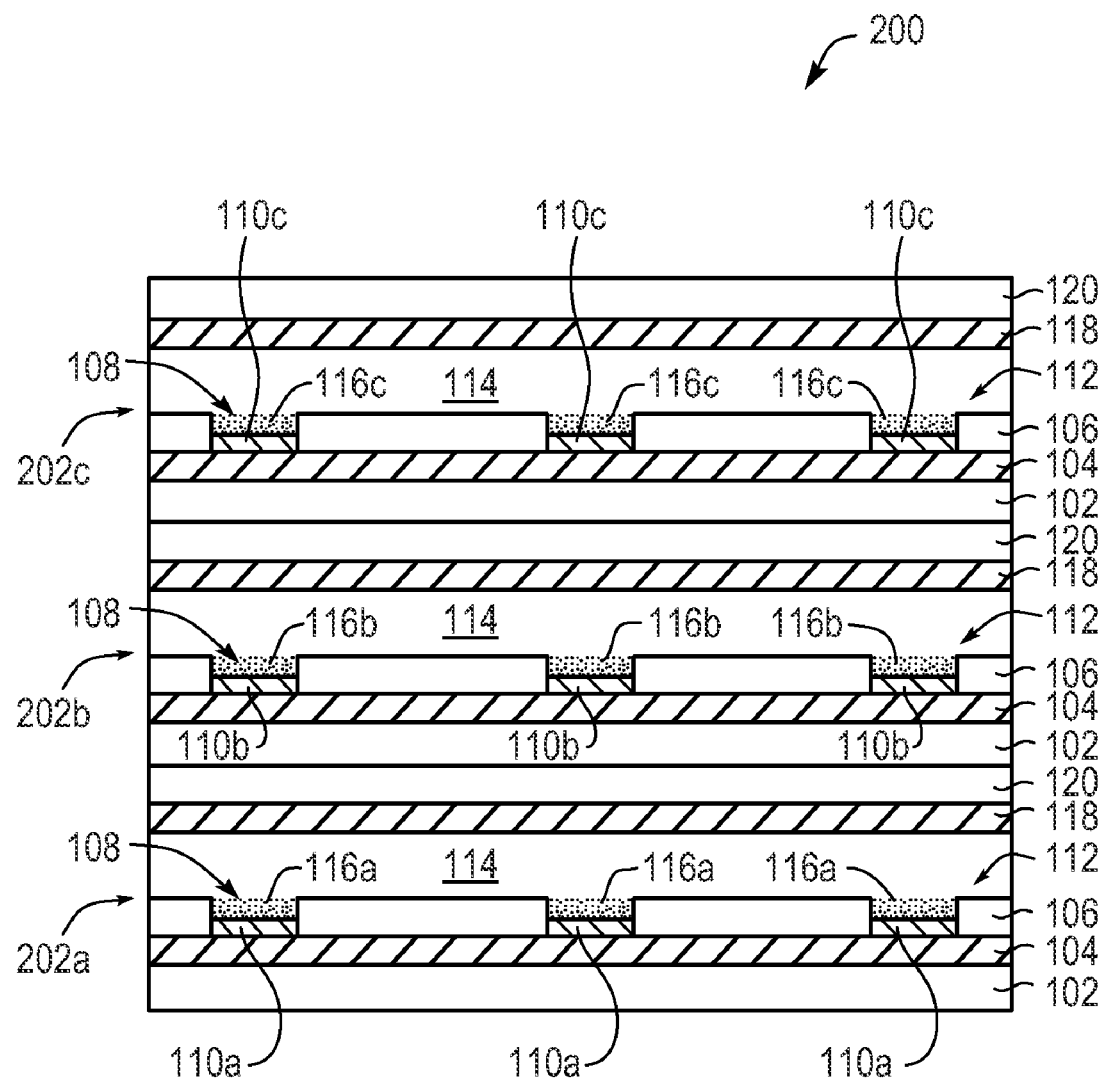
FIG. 2 depicts a cross-sectional view of an example of a stacked electro-optical display.

An example of a stacked device architecture is shown in FIG. 2. This configuration allows stacking of colored layers for electrophoretic/kinetic displays.

FIG. 2 illustrates a cross-sectional view of one example of stacked electro-optical display 200. Electro-optical display 200 includes a first display element 202a, a second display element 202b, and a third display element 202c. Third display element 202c is stacked on second display element 202b, and second display element 202b is stacked on first display element 202a.

First display element 202a is similar to electro-optical display 100a previously described and illustrated with reference to FIG. 1A. First display element 202a includes circular shaped thin layers 110a self-aligned within recess regions 108. First display element 202a also includes colorant particles 116a having a first color (e.g., cyan) for a full color electro-optical display.

Second display element 202b is similar to electro-optical display 100a previously described and illustrated with reference to FIG. 1A. Second display element 202b includes circular shaped thin layers 110b self-aligned within recess regions 108. Second display element 202b also includes colorant particles 116b having a second color (e.g., magenta) for a full color electro-optical display.

Third display element 202c is similar to electro-optical display 100a previously described and illustrated with reference to FIG. 1A. Third display element 202c includes circular shaped thin layers 110c self-aligned within recess regions 108. Third display element 202c also includes colorant particles 116c having a third color (e.g., yellow) for a full color electro-optical display. In other examples, colorant particles 116a, 116b, and 116c may include other suitable colors for providing an additive or subtractive full color electro-optical display.

In the example illustrated in FIG. 2, in the electro-optical display 200, first display element 202a, second display element 202b, and third display element 202c are aligned with each other. As such, thin layers 110a, 110b, and 110c are also aligned with each other. In this example, since recess regions 108 and self-aligned thin layers 110a, 110b, and 110c of each display element 202a, 202b, and 202c, respectively, are aligned, the clear aperture for stacked electro-optical display 200 is improved compared to a stacked electro-optical display without such alignment.

In an alternate example (not shown), first display element 202a, second display element 202b, and third display element 202c may be offset from each other. As such, thin layers 110a, 110b, and 110c are also offset from each other. In this example, since recess regions 108 and self-aligned thin layers 110a, 110b, and 110c are just a fraction of the total area of each display element 202a, 202b, and 202c, respectively, the clear aperture for stacked electro-optical display 200 remains high regardless of the alignment between display elements 202a, 202b, and 202c. As such, the process for fabricating stacked electro-optical display 200 is simplified. The self-aligned thin layers 110a, 110b, and 110c prevent tinting of each display element due to colorant particles 116a, 116b, and 116c, respectively, in the clear optical state. Therefore, a stacked full color electro-optical display having a bright, neutral white state and precise color control is provided.

In accordance with the teachings herein, electronic inks are provided that function in a clear to colored mode and have good stability, color saturation, and high switching speed. This allows stacking of colored layers for electrophoretic/kinetic displays. Alternatively, an ink containing two pigments may be placed in a single display cell, such as shown in FIGS. 1A-1B, for a bi-colored display.

The electronic inks are made from pigment particles that contain surface functionalized anionic groups on the pigments. Examples of such functionalized anionic groups include, but are not limited to, sulfonate, carboxylate, sulfate, phosphate, phosphonate, sulfinic acid, hydroxyl, and the like.

The pigments may be functionalized by reaction with a species that contains the desired functionalizing species (sulfonate, carboxylate, sulfate, phosphate, phosphonate, sulfinic acid, hydroxyl, and the like). However, it may be convenient to employ pigments which are commercially available and contain the desired functionalizing species. Such commercially-available functionalized pigments have been typically marketed for use in thermal or piezo inkjet aqueous dispersions and inks. These functionalized pigments when combined with additives in non-polar carrier fluids behave as negatively charged species, which makes such functionalized pigments useful as electronic inks for electrophoretic/kinetic displays.

The colored electronic inks that are made from pigments with functional groups can compact and spread effectively under an electric field. Examples of pigments with an anionic functionality and small particle size include aqueous dispersions typically marketed for use in thermal or piezo inkjet inks, specifically, CAB-O-JET™ 200, CAB-O-JET™ 250C, CAB-O-JET™ 260M, CAB-O-JET™ 270Y, CAB-O-JET™ 300, CAB-O-JET™ 400, CAB-O-JET™ 450C, CAB-O-JET™ 465M, CAB-O-JET™ 470Y, and CAB-O-JET™ 480V from Cabot Corporation (Billerica, Mass.). Other examples of similar pigment dispersions can be found from other aqueous pigment dispersion vendors, such as SensiJet® Black SDP2000 and other S.M.A.R.T.™ pigment dispersions using S.M.A.R.T.™ technology from Sensient Technologies Corporation (St. Louis, Mo.).

In order to formulate electronic inks in non-polar carrier fluids, however, the pigments need to be extracted from the aqueous dispersion. The following example process may be suitably employed for pigments functionalized with anionic groups such as sulfonate, carboxylate, sulfate, phosphate, phosphonate, sulfinic acid, hydroxyl, and the like.

Figure 3:
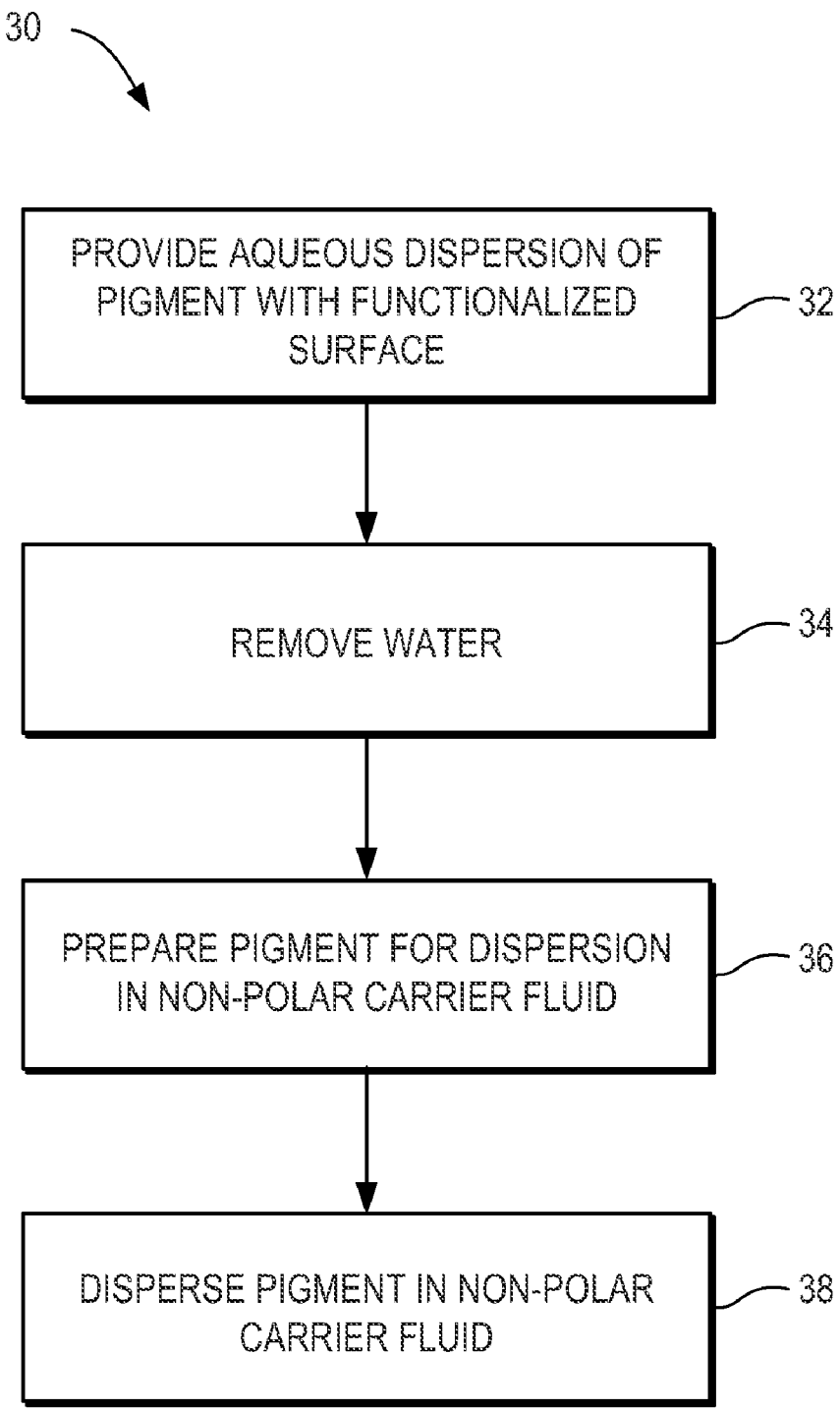
FIG. 3 is a flow chart depicting an example process for preparing a dispersion of a functionalized pigment in a nonpolar carrier fluid.

The process for preparing a functionalized pigment is shown in FIG. 3. The process 30 includes providing 32 an aqueous dispersion of the pigment with functionalized surface. As noted above, the aqueous dispersion of the pigment may be provided by reacting an appropriate functionalizing species with a pigment or by obtaining a commercially-available form of the functionalized pigment in an aqueous dispersion. Examples of reacting an appropriate functionalizing species with a pigment are taught in WO2000/52102 ("PROCESS FOR PREPARING COLORED PIGMENTS"). Alternatively, a commercially-available functionalized pigment, such as described above, may be employed.

The process 30 further includes removing 34 water from the aqueous dispersion. This may be accomplished in a variety of ways. In one example, the aqueous dispersion may be centrifuged and supernatant separated from the sediment. In some examples, the aqueous dispersion may be diluted with deionized (DI) water prior to centrifugation to reduce the amount of free salt. In some examples, the process of diluting and centrifuging may be repeated once, and, in some examples, the process may be repeated twice. In these examples, the repetition serves to clean the pigment and eliminate any free salts.

The process 30 further includes preparing 36 the pigment for dispersion in a non-polar carrier fluid. An example of preparing 36 the pigment involves adding water to the sediment resulting from centrifugation and then freeze-drying the pigment (or simply drying it) and then grinding the pigment.

Adding water to the sediment prior to drying appears to improve resulting product from the freeze-drying process.

The benefit of adding water and then freeze-drying usually provides better pigment powder, which gives better dispersion in non-polar solvents.

The freeze-drying (or drying) process may result in agglomeration of the pigment particles. To reduce the agglomeration, the dried pigment particles may be ground, such as with a mortar and pestle.

The process 30 concludes with dispersing 38 the pigment particles in a non-polar carrier fluid, or carrier fluid. The non-polar carrier fluid includes, for example, one or more non-polar carrier fluids selected from hydrocarbons, halogenated or partially halogenated hydrocarbons, and/or siloxanes. Some specific examples of non-polar carrier fluids include perchloroethylene, cyclohexane, dodecane, mineral oil, isoparaffinic fluids, cyclopentasiloxane, cyclohexasiloxane, and combinations thereof. An example of an isoparaffinic fluid is ISOPAR®, which is the brand name for several grades of high-purity isoparaffinic solvents with narrow boiling ranges, available from Exxon Mobile Corporation (Houston, Tex.). Specific examples of the isoparaffinic fluid that may be used in the practice of the various examples herein include, but are not limited to, ISOPAR® ISOPAR® H, ISOPAR® K, ISOPAR® L, and ISOPAR® M.

An example of the extraction process is as follows:

The aqueous dispersion may be diluted with DI water and mixed.

The diluted mixture may be centrifuged and supernatant separated from the sediment.

The above process may be repeated at least twice.

DI water may be added to the sediment and mixed.

The mixture may be freeze-dried.

The dried pigment may be subjected to grinding.

Thermogravimetric analysis (TGA) may be conducted to determine the dryness of the extracted pigment. In some examples, the pigment may be at least 98% dry, and in other examples, at least 99% dry.

In another example of removing 34 water from the aqueous dispersion and preparing 36 the pigment for dispersion in a non-polar carrier fluid, the functionalized pigment may be sequentially washed and separated by centrifugation with successively less polar solvents, such as starting with DI water, then an alcohol that is soluble in water, and finally the carrier fluid to be used in constituting the functionalized pigment particles in the electronic ink. An example of the alcohol is anhydrous iso-propyl alcohol. An example of the carrier fluid is ISOPAR®.

Once the pigment is extracted, it may be formulated into electronic inks using additives and one or more non-polar carrier fluids. Table I shows examples of electronic ink formulations using cyan pigments extracted from a cyan aqueous dispersion.

TABLE I

Cyan Ink Formulation Examples.

| Ink Example | Pigment concentration (%) | Additive I (%) | Additive II (%) | Additive III (%) | Carrier fluid ISOPAR ® |
|---|---|---|---|---|---|
| 1 | 3 | 0.5 | 3 | 0 | balance |
| 2 | 3 | 0.5 | 0 | 3 | balance |
| 3 | 2 | 2 | 1.8 | 0 | balance |
| 4 | 1 | 3 | 1 | 0 | balance |
| 5 | 3 | 0.5 | 1 | 0 | balance |
| 6 | 2 | 0.5 | 3 | 0 | balance |
| 7 | 1 | 3 | 3 | 0 | balance |
| 8 | 3 | 3 | 1 | 0 | balance |

Notes:
Additive I = polyisobutylene succinimide
Additive II = polyhydroxystearic amide salt
Additive III = polyhydroxystearic acid The cyan inks were then made into a test cell consisting of electrodes and were tested under an electric field (E-field). The test cell was similar to that shown in FIGS. 1A-1B.

Figure 4:
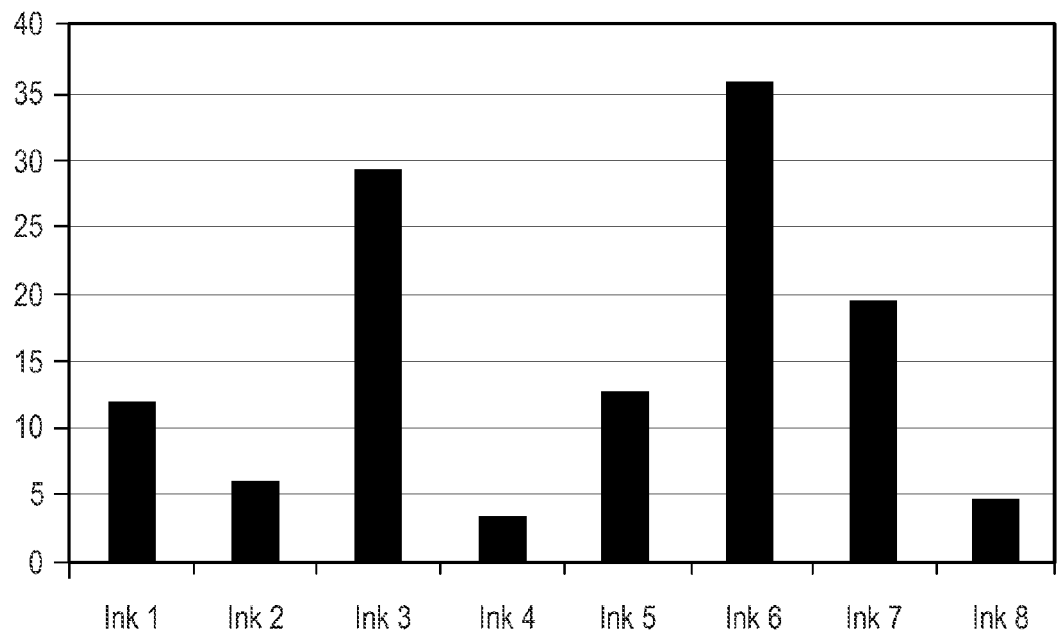
FIG. 4, on coordinates of nominal contrast and ink example number, is a graph depicting the nominal contrast of eight different inks, each including a functionalized cyan pigment prepared by an example process.

FIG. 4 shows the nominal contrast values (defined as the difference between measured light intensity of light state and dark state) obtained for the eight inks listed in Table I. From these results, it appears that one composition, namely, ink #6, has the highest nominal contrast. However, the other inks may also be suitably employed in electro-optical displays.

Colorimetric measurement of the test cell containing ink #6 is shown in Table II as compared with SNAP (Specifications for Newsprint Advertising Production) and SWOP (Specifications for Web Offset Publications) references. The lightness and chroma of this device are similar to or higher than the two reference specifications. Both the measured value (average value) and the standard deviation (S.D.) are listed.

TABLE II

Colorimetric Measurement of Cell Containing Example #6 Cyan Ink.

| Cyan Ink Example #6 | SNAP | SWOP | Measured (average) | Measured (S.D.) |
|---|---|---|---|---|
| L* | 56.58 | 56.63 | 56.43 | 0.28 |
| C* | 35.32 | 55.79 | 59.05 | 0.35 |
| a* | −23.4 | −37.92 | −46.54 | 0.12 |
| b* | −26.45 | −40.92 | −36.35 | 0.41 |

Two black pigments, one functionalized with sulfonate and one functionalized with carboxylate, were processed as described above and made into inks. Table III shows the composition of the inks and the measured nominal contrast. Additives I and II are as listed in Table I above.

TABLE III

Black Ink Formulation Examples and Nominal Contrast.

| Ink Example | Pigment concentration (%) | Functional Type | Additive I (%) | Additive II (%) | Carrier Fluid ISOPAR ® | Nominal Contrast |
|---|---|---|---|---|---|---|
| 9 | 4 | Sulfonate | 0.5 | 3 | balance | 49.57 |
| 10 | 4 | Carboxylate | 0.5 | 3 | balance | 40.22 |

A number of yellow electronic inks were prepared from yellow pigments extracted from a yellow aqueous dispersion. Table IV shows examples of such formulations. Additives I, II, and III are as listed in Table I above.

TABLE IV

Yellow Ink Formulation Examples.

| Ink Example | Pigment concentration (%) | Additive I (%) | Additive II (%) | Additive III (%) | Carrier Fluid ISOPAR® |
|---|---|---|---|---|---|
| 11 | 3 | 0.5 | 3 | 0 | balance |
| 12 | 3 | 0.5 | 0 | 3 | balance |
| 13 | 2 | 2 | 1.8 | 0 | balance |
| 14 | 1 | 3 | 1 | 0 | balance |
| 15 | 3 | 0.5 | 1 | 0 | balance |
| 16 | 2 | 0.5 | 3 | 0 | balance |
| 17 | 1 | 3 | 3 | 0 | balance |
| 18 | 3 | 3 | 1 | 0 | balance |
| 19 | 2.5 | 0.75 | 5 | 0 | balance |
| 20 | 2.5 | 0.75 | 3 | 0 | balance |

The yellow inks were then made into a test cell consisting of electrodes and were tested under an E-field. The test cell was similar to that shown in FIGS. 1A-1B.

Figure 5:
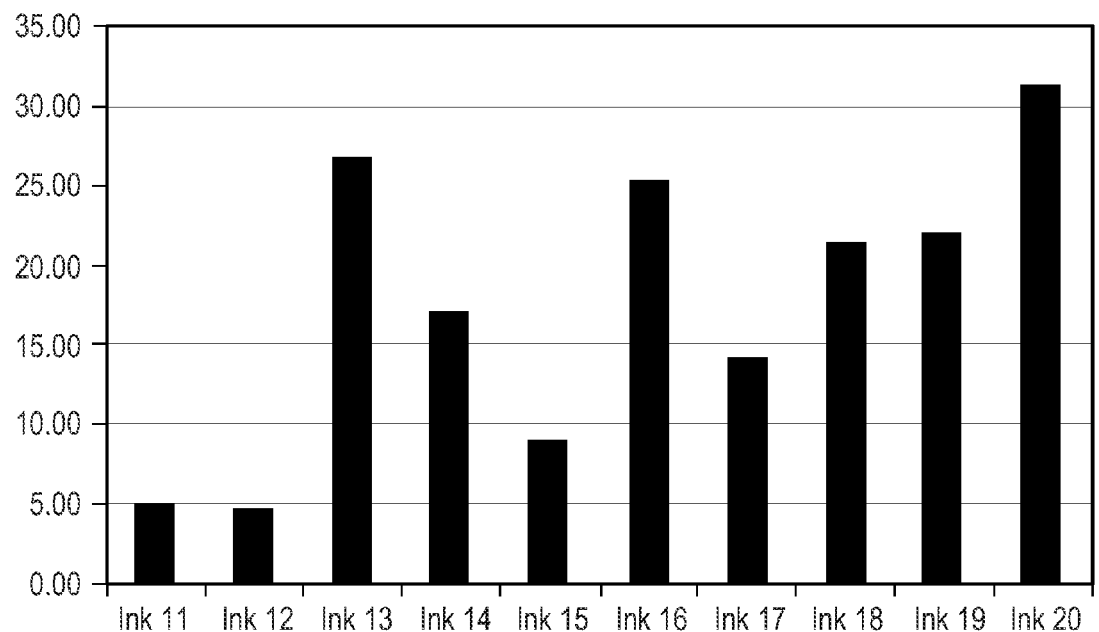
FIG. 5, on coordinates of nominal contrast and ink example number, is a graph depicting the nominal contrast of ten different inks, each including a functionalized yellow pigment prepared by an example process.

FIG. 5 shows the nominal contrast values obtained for the ten inks listed in Table IV. From these results, it appears that one composition, namely, ink #20, has the highest nominal contrast. However, the other inks may also be suitably employed in electro-optical displays.

Colorimetric measurement of the test cell containing ink #20 is shown in Table V as compared with SNAP and SWOP references. The lightness and chroma of this device are higher than or between the SNAP reference and SWOP reference.

TABLE V

Colorimetric Measurement of Cell Containing Example #20 Yellow Ink.

| Yellow Example #20 | SNAP | SWOP | Measured |
|---|---|---|---|
| L* | 76.57 | 85.46 | 86.40 |
| C* | 54.87 | 84.72 | 75.92 |
| a* | −4.05 | −5.85 | −7.99 |
| b* | 54.72 | 84.52 | 75.50 |

Turning now to electronic inks that employ the functionalized pigments discussed above, examples of such electronic inks generally include a non-polar carrier fluid (i.e., a fluid having a low dielectric constant k such as, e.g., less than about 20, or, in some cases, less than about 2). Such fluids tend to reduce leakages of electric current when driving the display, as well as increase the electric field present in the fluid. As used herein, the "carrier fluid" is a fluid or medium that fills up a viewing area defined in an electronic ink display and is generally configured as a vehicle to carry colorant particles therein. In response to a sufficient electric potential or field applied to the colorant particles while driving electrodes of the display, the colorant particles tend to move and/or rotate to various spots within the viewing area in order to produce a desired visible effect in the display cell to display an image. The non-polar carrier fluid includes, for example, one or more non-polar carrier fluids selected from hydrocarbons, halogenated or partially halogenated hydrocarbons, and/or siloxanes. Some specific examples of non-polar carrier fluids include perchloroethylene, cyclohexane, dodecane, mineral oil, isoparaffinic fluids, cyclopentasiloxane, cyclohexasiloxane, and combinations thereof.

The colorant particles are dispersed in the carrier fluid. As used herein, the term "colorant particles" refers to particles that produce a color. Some non-limiting examples of suitable colorant particles include the surface-modified pigment particles described above. In a non-limiting example, the colorant particles are selected from pigment particles that are self-dispersible in the non-polar carrier fluid. It is to be understood, however, that non-dispersible pigment particles may otherwise be used so long as the electronic ink includes one or more suitable dispersants. Such dispersants include hyperdispersants such as those of the SOLSPERSE® series manufactured by Lubrizol Corp., Wickliffe, Ohio (e.g., SOLSPERSE® 3000, SOLSPERSE® 8000, SOLSPERSE® 9000, SOLSPERSE® 11200, SOLSPERSE® 13840, SOLSPERSE® 16000, SOLSPERSE® 17000, SOLSPERSE® 18000, SOLSPERSE® 19000, SOLSPERSE® 21000, and SOLSPERSE® 27000); various dispersants manufactured by BYK-chemie, Gmbh, Germany, (e.g., DISPERBYK® 110, DISPERBYK® 163, DISPERBYK® 170, and DISPERBYK® 180); various dispersants manufactured by Evonik Goldschmidt GMBH LLC, Germany, (e.g., TEGO® 630, TEGO® 650, TEGO® 651, TEGO® 655, TEGO® 685, and TEGO® 1000); and various dispersants manufactured by Sigma-Aldrich, St. Louis, Mo., (e.g., SPAN® 20, SPAN® 60, SPAN® 80, and SPAN® 85).

In some examples, the concentration of pigment in the electronic ink ranges from about 0.5 to 20 percent by weight (wt %). In other examples, the concentration of the pigment ranges from about 1 to 10 wt %. In some examples, the concentration of dispersant in the electronic ink ranges from about 0.5 to 20 percent by weight (wt %). In other examples, the concentration of the pigment ranges from about 1 to 10 wt %. The carrier fluid makes up the balance of the ink.

There is commonly a charge director employed in electronic inks. As used herein, the term "charge director" refers to a material that, when used, facilitates charging of the colorant particles. In an example, the charge director is basic and reacts with the acid-modified colorant particle 112 to negatively charge the particle. In other words, the charging of the particle 112 is accomplished via an acid-base reaction between the charge director and the acid-modified particle surface. This is one possible charging mechanism. Another possible charging mechanism is the adsorption of charged micelles. In any event, it is to be understood that the charge director may also be used in the electronic ink to prevent undesirable aggregation of the colorant in the carrier fluid.

The charge director may be selected from small molecules or polymers that are capable of forming reverse micelles in the non-polar carrier fluid. Such charge directors are generally colorless and tend to be dispersible or soluble in the carrier fluid.

In a non-limiting example, the charge director is selected from a neutral and non-dissociable monomer or polymer such as, e.g., a polyisobutylene succinimide amine, which has a molecular structure as follows:

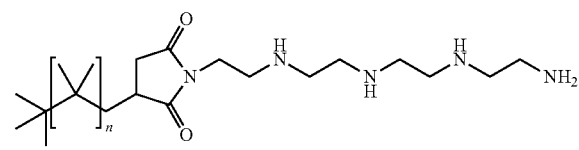

where n is selected from a whole number ranging from 15 to 100.

Another example of the charge director includes an ionizable molecule that is capable of disassociating to form charges. Non-limiting examples of such charge directors include sodium di-2-ethylhexylsulfosuccinate and dioctyl sulfosuccinate. The molecular structure of dioctyl sulfosuccinate is as follows:

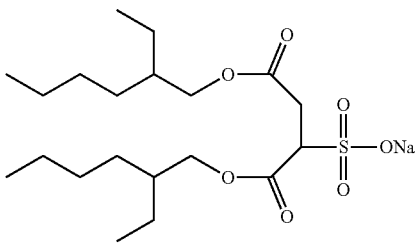

Yet another example of the charge director includes a zwitterion charge director such as, e.g., lecithin. The molecular structure of lecithin is as shown as follows:

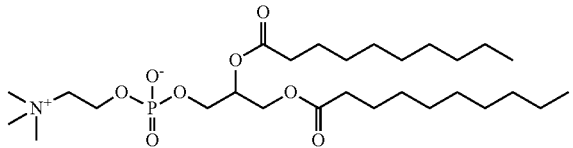

The pigment particles are selected from organic or inorganic pigments, and have an average particle size ranging from about 1 nm to about 10 μm. In some examples, the average particle size ranges from about 10 nm to about 1 μm. In other examples, the average particle size ranges from about 30 to 500 nm. Such organic or inorganic pigment particles may be selected from black pigment particles, yellow pigment particles, magenta pigment particles, red pigment particles, violet pigments, cyan pigment particles, blue pigment particles, green pigment particles, orange pigment particles, brown pigment particles, and white pigment particles. In some instances, the organic or inorganic pigment particles may include spot-color pigment particles, which are formed from a combination of a predefined ratio of two or more primary color pigment particles. To the extent that the generic pigments on the foregoing list can be functionalized as taught herein, such pigments may be used in the practice of the teachings herein. Likewise, to the extent that the following examples of specific pigments can be functionalized as taught herein, such pigments may be used in the practice of the teachings herein.

A non-limiting example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® L, MONARCH® 700, MONARCH® 800, MONARCH® 880, MONARCH® 900, MONARCH® 1000, MONARCH® 1100, MONARCH® 1300, and MONARCH® 1400); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). A non-limiting example of an organic black pigment includes aniline black, such as C.I. Pigment Black 1.

Non-limiting examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, Pigment Yellow 155, C.I. Pigment Yellow 167, C.I. Pigment Yellow 172, and C.I. Pigment Yellow 180.

Non-limiting examples of suitable magenta or red or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48 (Ca), C.I. Pigment Red 48 (Mn), C.I. Pigment Red 57 (Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Non-limiting examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Non-limiting examples of green organic pigments include C.I. Pigment Green 1, C.I. Pigment Green 2, C.I. Pigment Green, 4, C.I. Pigment Green 7, C.I. Pigment Green 8, C.I. Pigment Green 10, C.I. Pigment Green 36, and C.I. Pigment Green 45.

Non-limiting examples of brown organic pigments include C.I. Pigment Brown 1, C.I. Pigment Brown 5, C.I. Pigment Brown 22, C.I. Pigment Brown 23, C.I. Pigment Brown 25, and C.I. Pigment Brown, C.I. Pigment Brown 41, and C.I. Pigment Brown 42.

Non-limiting examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

The colored electronic inks allow the construction of stacked color displays that have bright color, are readable under sun light, use low power and can be made flexible and light weight.

The foregoing functionalized pigments have been described with specific application to electronic inks. However, the functionalized pigments may find use in other ink technologies that employ non-aqueous inks. An example of such other ink technology is liquid electrophoretic ink (LEP) used in commercial digital printers.

What is claimed is:

1. A pigment-based ink, including:
a non-polar carrier fluid; and
water-free pigment particles extracted from aqueous dispersions suspended in the non-polar carrier fluid, the pigment particles having surface functionalized anionic groups.

2. The ink of claim 1 wherein the non-polar carrier fluid is a non-polar carrier fluid selected from the group consisting of hydrocarbons, halogenated or partially halogenated hydrocarbons, and siloxanes.

3. The ink of claim 2 wherein the non-polar carrier fluid is selected from the group consisting of perchoroethylene, cyclohexane, dodecane, mineral oil, isoparaffinic fluids, cyclopentasiloxane, cyclohexasiloxane, and combinations thereof.

4. The ink of claim 1 wherein the pigment particles are selected from the group consisting of black pigment particles, yellow pigment particles, magenta pigment particles, red pigment particles, violet pigment particles, cyan pigment particles, blue pigment particles, green pigment particles, orange pigment particles, brown pigment particles, and white pigment particles.

5. The ink of claim 1 wherein the surface functionalized anionic groups are selected from the group consisting of sulfonate, carboxylate, sulfate, phosphate, phosphonate, sulfinic acid, and hydroxyl.

6. In combination, an electronic display and an electronic ink,
wherein the electronic display includes:
a first electrode;
a second electrode; and
a display cell defined by a dielectric material between the first electrode and the second electrode, the display cell containing the electronic ink,
wherein the dielectric layer is structured with recess regions that allow the pigment particles to collect and compact over the first electrode in response to a bias being applied to the first electrode with respect to the second electrode; and
wherein the electronic ink includes:
a non-polar carrier fluid; and
water-free pigment particles extracted from aqueous dispersions suspended in the non-polar carrier fluid, the pigment particles having surface functionalized anionic groups.

7. The combination of claim 6 wherein the electronic display includes a plurality of display cells in a stacked configuration, associated first electrodes and second electrodes, and a plurality of electronic inks of different colors, each display cell containing an electronic ink of a different color.

8. The combination of claim 6 wherein the non-polar carrier fluid is a non-polar carrier fluid selected from the group consisting of hydrocarbons, halogenated or partially halogenated hydrocarbons, and siloxanes.

9. The combination of claim 8 wherein the non-polar carrier fluid is selected from the group consisting of perchoroethylene, cyclohexane, dodecane, mineral oil, isoparaffinic fluids, cyclopentasiloxane, cyclohexasiloxane, and combinations thereof.

10. The combination of claim 6 wherein the pigment particles are selected from the group consisting of black pigment particles, yellow pigment particles, magenta pigment particles, red pigment particles, violet pigment particles, cyan pigment particles, blue pigment particles, green pigment particles, orange pigment particles, brown pigment particles, and white pigment particles.

11. The combination of claim 6 wherein the surface functionalized anionic groups are selected from the group consisting of sulfonate, carboxylate, sulfate, phosphate, phosphonate, sulfinic acid, and hydroxyl.

12. A process for treating a water-free pigment extracted from aqueous dispersions for use in a pigment-based ink, the method including:
providing an aqueous dispersion of the pigment, the pigment comprising particles having surface functionalized anionic groups;
removing the water; and
preparing the pigment for dispersion in a non-polar carrier fluid.

13. The process of claim 12 further including dispersing the pigment in the non-polar carrier fluid.

14. The process of claim 12 wherein the process of removing the water includes centrifuging a diluted mixture to produce supernatant and pigment sediment and separating the supernatant from the pigment.

15. The process of claim 12 wherein the process of preparing the pigment includes drying the pigment and grinding the dried pigment.

16. The process of claim 12 wherein the process comprises:
providing the aqueous dispersion of the pigment;
mixing the aqueous dispersion with water;
centrifuging the diluted mixture and separating the supernatant from the sediment;
adding water to the sediment;
freeze-drying the mixture;
grinding the dried pigment; and
dispersing the pigment in the non-polar carrier fluid.

17. The process of claim 16 wherein the steps of mixing, centrifuging, and separating are repeated at least once.

18. The process of claim 12 in which the process for removing water from the aqueous dispersion and preparing the pigment for dispersion in a non-polar carrier fluid comprises sequentially washing the functionalized pigment with successively less polar carrier fluids and separating the washed pigment by centrifugation.

19. The process of claim 12 wherein the surface functionalized anionic groups are selected from the group consisting of sulfonate, carboxylate, sulfate, phosphate, phosphonate, sulfinic acid, and hydroxyl.

* * * * *

UNITED STATES PATENT AND TRADEMARK OFFICE
CERTIFICATE OF CORRECTION

PATENT NO. : 8,331,014 B2
APPLICATION NO. : 12/917672
DATED : December 11, 2012
INVENTOR(S) : Qin Liu et al.

It is certified that error appears in the above-identified patent and that said Letters Patent is hereby corrected as shown below:

In the Claims

In column 13, line 34, in Claim 3, delete "perchoroethylene," and insert -- perchloroethylene, --, therefor.

In column 14, lines 11-12, in Claim 9, delete "perchoroethylene," and insert -- perchloroethylene, --, therefor.

Signed and Sealed this
Fourteenth Day of May, 2013

Teresa Stanek Rea
*Acting Director of the United States Patent and Trademark Office*